Oct. 27, 1931.  R. F. SCHABER  1,829,303
HEATER
Filed May 17, 1930
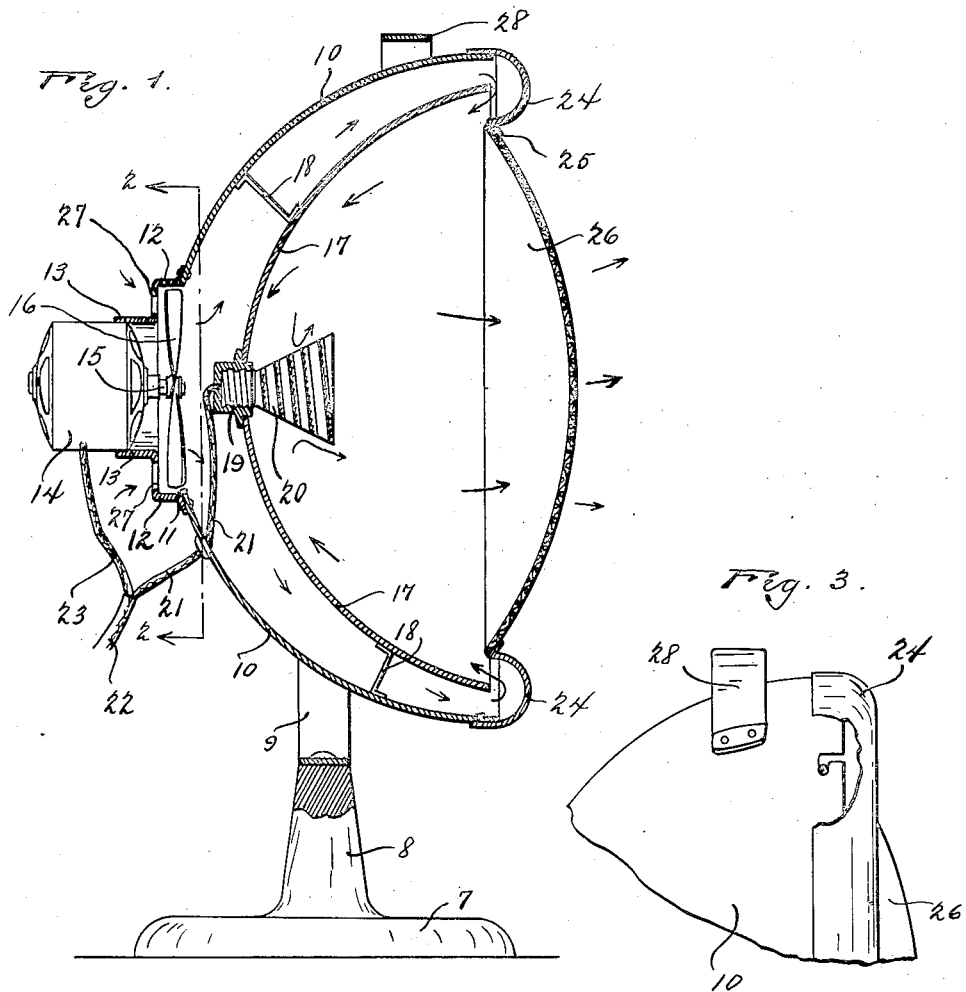
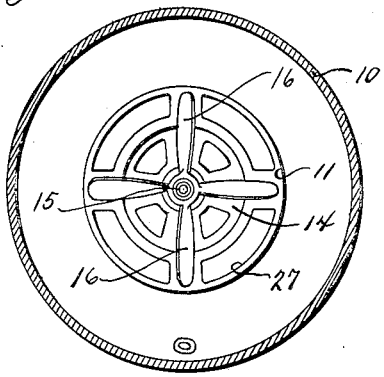
INVENTOR.
Ralph F. Schaber
BY
ATTORNEY.

Patented Oct. 27, 1931

1,829,303

UNITED STATES PATENT OFFICE

RALPH F. SCHABER, OF DETROIT, MICHIGAN

HEATER

Application filed May 17, 1930. Serial No. 453,135.

My invention relates to a new and useful improvement in a heater and particularly adapted for use on an electric heater. It is an object of the present invention to provide a heater so constructed and arranged that a maximum efficiency may be obtained from the heating element.

Another object of the invention is the provision in a heater of this class of means for producing a current of air which will be brought over and into contact with heating surfaces so that a circulation of heated air from the heating element may be effected.

Another object of the invention is the provision of a heater of this class of air current producing means co-operating with a structure whereby the air may be brought into contact with a heating surface and deflected toward the heating element toward its passage outwardly into the room in which used.

Another object of the invention is the provision of a device of this class which will be simple in structure, economical of manufacture, and highly efficient in use.

Other objects will appear hereinafter.

The invention consists in the combination and arrangement of parts hereinafter described and claimed.

The invention will be best understood by a reference to the accompanying drawings which form a part of this specification and in which:

Fig. 1 is a central vertical sectional view of the invention.

Fig. 2 is a view taken on line 2—2 of Fig. 1.

Fig. 3 is a fragmentary side elevational view of the invention with parts broken away.

The invention comprises a base 7 projecting upwardly from which is a standard 8 to which is attached a supporting bracket 9 connected at its upper end to a concave semi-spherical shell 10. This shell, at its center, is provided with an opening 11 secured around which is the cylindrical supporting member 12 having a portion turned radially inwardly and provided with a reduced cylindrical portion 13 in which is securely mounted an electric motor 14. Mounted on the shaft 15 of this motor is a fan 16 which is positioned within the member 12 and adapted to direct a current of air toward the deflecting shell 17 which is positioned inwardly of the supporting shell 10 and which is also formed concave and substantially semi-spherical. This reflecting shell 17 is connected to the outer supporting shell 10 by the supporting brackets 18 which are secured at their opposite ends to the shells 17 and 10 by welding or in any other suitable manner. Mounted centrally in the reflecting shell is an electric socket 19 in which may be secured the electric heating element 20, this socket being connected by the wire 21 to a suitable source of electrical energy. The wire 21 being passed through the cable 22 through also which extends the wire 23 which is connected to the motor 14. Mounted on the outer edge of the shell 10 is a deflecting ring 24 formed trough shaped or substantially semi-circular in cross section and having one edge laterally turned, as at 25, on which the screen 26 is mounted. It will be noted that the deflecting ring 24 overlies the edge of the reflecting shell 17 so that space is provided through which the air which passes through the openings 27 and which is driven in the direction of the arrows by the fan 16 may be deflected inwardly of the shell 17 so as to approach and surround the heating element 20. A handle 28 is mounted on the shell 10 to afford means for carrying the heater from one place to another.

When the current is turned on to the heating element and the fan set in rotation, the shell 17 will become heated and the air driven by the fan between the shells 17 and 10 toward the forward edge thereof will become heated by being passed over the surface or in close proximity to the surface of the shell 17. When this air is deflected so as to pass inwardly of the shell 17 it will become further heated and when brought into close proximity to the heating element before passing outwardly through the screen 26 in the direction indicated by the arrows, a further heating of the air will be effected. In this way a maximum heating efficiency is obtained in the heater and a circulation of the heated air is effected, thus giving rise to all of the advantages which result from such increased heating efficiency.

While I have illustrated and described the preferred form of my invention, I do not wish to limit myself to the precise details of structure shown but desire to avail myself of such variations and modifications as may come within the scope of the appended claims.

Having thus described my invention, what I claim as new and desire to secure by Letters Patent is:

1. In a heater of the class described: a supporting shell; a reflecting shell mounted inwardly of said supporting shell; a heating element carried by said reflecting shell; means for producing a current of air between said shells directed toward the open ends thereof; and a deflecting member mounted on the open edge of one of said shells for deflecting the current of air passing from between said shells inwardly of said reflecting shell.

2. In a heater of the class described: an outer supporting shell formed substantially semi-spherical; a smaller substantially semi-spherical reflecting shell positioned inwardly of and spaced from said supporting shell, said reflecting shell being imperforated; a heating element carried by said reflecting shell; means for producing a current of air between said shells directed toward the open ends thereof; and deflecting means mounted on one of said shells for deflecting the current of air passing from between said shells inwardly of said reflecting shell.

3. In a heater of the class described: an outer supporting shell formed substantially semi-spherical; a smaller substantially semi-spherical reflecting shell positioned inwardly of and spaced from said supporting shell; means for mounting said shells in fixed relation; an electric heating element mounted on said reflecting shell at substantially its center; means mounted on said supporting shell at substantially its center for producing a blast of air between said shells directed toward the open edges thereof; and a trough shaped deflecting member mounted on one of said shells and deflecting the air passing from between the same, inwardly of said reflecting shell and toward said heating element.

4. In a heater of the class described: an outer substantially semi-spherical supporting shell; a smaller substantially semi-spherical reflecting shell positioned inwardly of and spaced from said supporting shell; means for mounting said shells in fixed relation; an electric heating element mounted centrally in said reflecting shell; a cylindrical supporting member mounted on said outer shell surrounding an opening formed therein; a reduced concentrically arranged cylindrical portion on said cylindrical supporting member; an electric motor mounted in said reduced portion; a fan positioned in said cylindrical supporting member rotatable by said motor for directing a current of air between said shells toward the open edges thereof; a trough shaped deflecting ring mounted on said outer shell and overlying said reflecting shell for deflecting inwardly of said deflecting shell toward said heating element, currents of air passing from between said shells.

5. In a heater of the class described: an outer substantially semi-spherical supporting shell; a smaller substantially semi-spherical reflecting shell positioned inwardly of and spaced from said supporting shell; means for mounting said shells in fixed relation; an electric heating element mounted centrally in said reflecting shell; a cylindrical supporting member mounted on said outer shell surrounding on opening formed therein; a reduced concentrically arranged cylindrical portion on said cylindrical supporting member; an electric motor mounted in said reduced portion; a fan positioned in said cylindrical supporting member rotatable by said motor for directing a current of air between said shells toward the open edges thereof; a trough shaped deflecting ring mounted on said outer shell and overlying said reflecting shell for deflecting inwardly of said deflecting shell toward said heating element, currents of air passing from between said shells; an outwardly turned portion of said deflecting ring; and a screen mounted on said outwardly turned portion.

In testimony whereof I have signed the foregoing specification.

RALPH F. SCHABER.